US008700071B2

(12) United States Patent
Tims et al.

(10) Patent No.: US 8,700,071 B2
(45) Date of Patent: Apr. 15, 2014

(54) DIRECT MOBILE STATION-TO-MOBILE STATION COMMUNICATION OF MULTIMEDIA MESSAGE SERVICE (MMS) MESSAGES

(75) Inventors: Brian F. Tims, Nazareth, PA (US); Carlos A. Cazanas, Bethlehem, PA (US)

(73) Assignee: Cellco Partnership, Basking Ridge, NJ (US)

( * ) Notice: Subject to any disclaimer, the term of this patent is extended or adjusted under 35 U.S.C. 154(b) by 826 days.

(21) Appl. No.: 12/184,879

(22) Filed: Aug. 1, 2008

(65) Prior Publication Data

US 2010/0029308 A1 Feb. 4, 2010

(51) Int. Cl.
*H04W 4/00* (2009.01)
*H04W 40/00* (2009.01)
*G06F 15/16* (2006.01)

(52) U.S. Cl.
USPC ............ 455/466; 455/428; 709/206; 709/219

(58) Field of Classification Search
USPC ......................................................... 455/466
See application file for complete search history.

(56) References Cited

U.S. PATENT DOCUMENTS

| 6,020,915 | A * | 2/2000 | Bruno et al. ................ 348/14.09 |
| 2005/0176423 | A1 * | 8/2005 | Park et al. ........................ 455/428 |
| 2005/0220064 | A1 | 10/2005 | Hundscheidt et al. |
| 2005/0235048 | A1 | 10/2005 | Costa-Requena et al. |
| 2006/0031369 | A1 * | 2/2006 | Caron et al. ................... 709/207 |
| 2006/0142029 | A1 * | 6/2006 | Shao et al. .................... 455/466 |
| 2006/0195506 | A1 * | 8/2006 | Deng ............................ 709/203 |
| 2007/0094279 | A1 * | 4/2007 | Mittal et al. .................. 707/100 |
| 2008/0130845 | A1 * | 6/2008 | Bose et al. ................. 379/93.07 |
| 2009/0125677 | A1 * | 5/2009 | Leveque et al. ............... 711/113 |

FOREIGN PATENT DOCUMENTS

| WO | WO 97/10684 | 3/1997 |
| WO | 2004/052033 | 6/2004 |

OTHER PUBLICATIONS

International Search Report and the Written Opinion of the International Searching Authority issued in International Patent Application No. PCT/US2009/052382 dated Sep. 24, 2009.
EPO Supplemental Search Report Issued in App. No. 09803641.1 on May 16, 2012.

* cited by examiner

*Primary Examiner* — Christopher M Brandt
*Assistant Examiner* — Muthuswamy Manoharan

(57) ABSTRACT

Multimedia message service (MMS) communications directly between mobile stations avoid interactions with a MMS Center (MMSC). In the examples, the originating station sends a short message service (SMS) message notifying the destination mobile station of the availability of the MMS message. This message provides an IP address of the originating station and an identifier for retrieval of the MMS message. In response, the destination mobile station sends back a packet message using the IP address of the originating station and the identifier, to request retrieval of the MMS message. The request message also includes an IP address for packet communication with the destination station. The originating mobile station uses that address for packet communication of the MMS message to the destination mobile station. In the examples, the destination station sends the MMS message to a regional node, for possible transcoding and/or to facilitate billing.

5 Claims, 5 Drawing Sheets

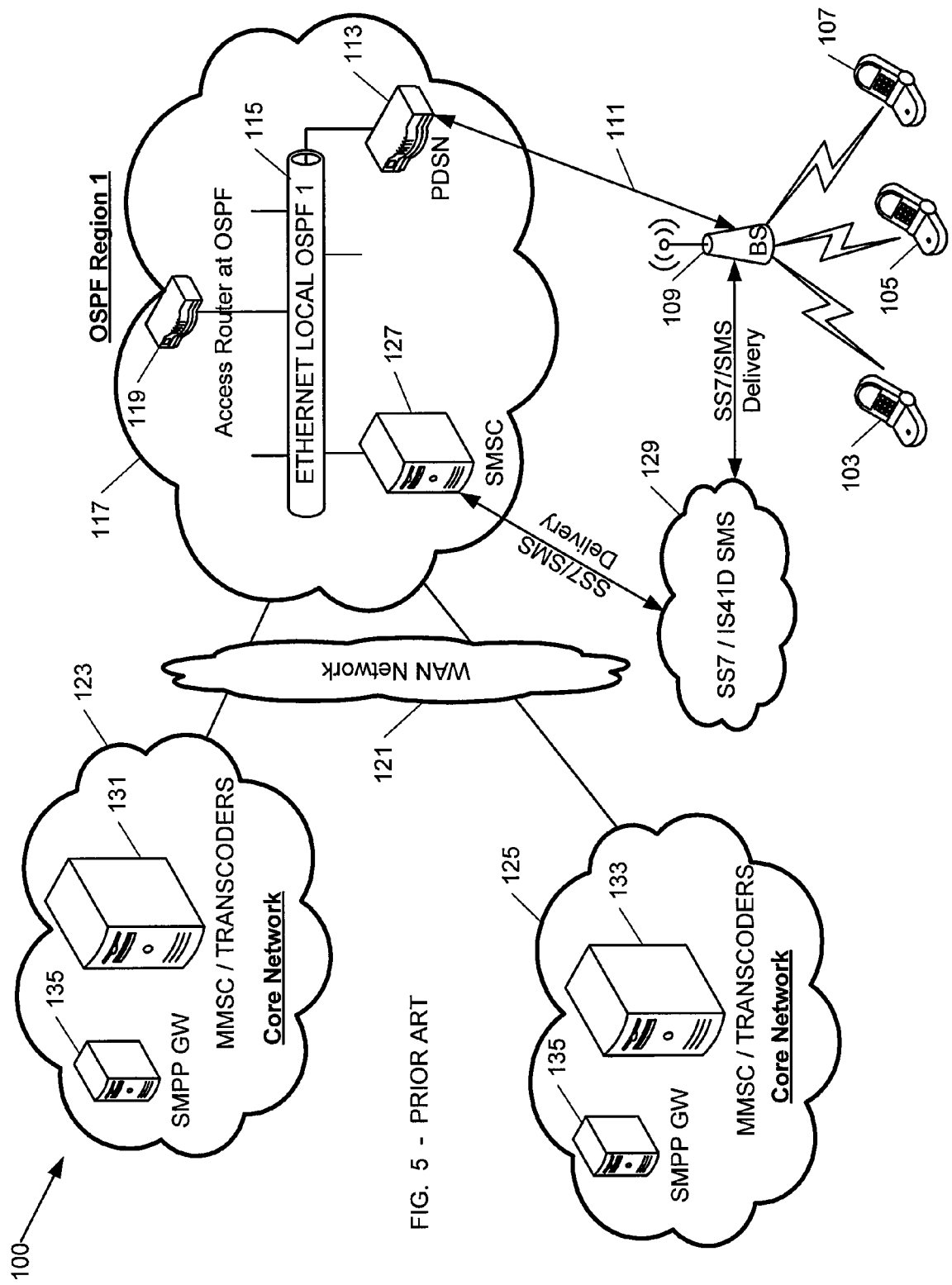
FIG. 5 - PRIOR ART

DIRECT MOBILE STATION-TO-MOBILE STATION COMMUNICATION OF MULTIMEDIA MESSAGE SERVICE (MMS) MESSAGES

TECHNICAL FIELD

The present subject matter relates to techniques and equipment to facilitate direct communication, mobile station to mobile station, of multimedia messages for example messages of a wireless carrier or service provider's multimedia message service (MMS).

BACKGROUND

In recent years, public mobile wireless communication services have offered a number of message communication services. For example, wireless carriers developed a short message service (SMS) to transmit text messages for display on the mobile stations. Although text messaging remains popular, demand has arisen to communicate messages containing larger more complex components, such as images, sound or video (moving images alone or with associated audio). To meet this demand, and as the public wireless communication networks have evolved to provide greater bandwidth and packet based services, the industry has developed a multimedia message service or "MMS."

MMS is a store and forward messaging service/standard that allows mobile devices to send and receive messages that may include any combination of multimedia objects (images, audio, video, rich text, etc). MMS has been designed to work with third generation mobile packet data services such as General Packet Radio Service (GPRS) and 1x-Evolution-Data Only (EVDO). MMS provides an end-to-end solution for personal multimedia mobile communication services. For example, MMS offers capabilities for various types of multimedia communications including terminal-to-terminal, terminal-to-application server, and application server-to-terminal.

As noted, MMS is a store and forward type service. In a typical message delivery scenario for communication to a mobile station, a sender transmits a message to a multimedia message service center (MMSC). Picture Messaging Service, for example, is done by mobile stations sending pictures to an MMSC, and the MMSC forwards picture messages to the recipients' mobile stations. In such an implementation, the MMSC stores a message from the sender's mobile station and sends a notification to the mobile station of the intended recipient. The notification includes a message locator, typically a URL, that identifies the location of the message in storage. Upon receipt of the notification message, the mobile station of the intended recipient uses the message locator to communicate with the MMSC and obtain delivery of the MMS message from storage. If necessary, the MMSC may also convert or transcode the multimedia content from a format in which it was received into a format that is compatible with the mobile station of the intended recipient.

FIG. 5 is a simplified functional diagram showing an example of a typical wireless mobile communication network, which offers such a store and forward type MMS service using a number of MMSCs. As shown, a communication network 100 may provide mobile voice telephone communications as well as packet data services, for numerous mobile stations. For purposes of later discussion, mobile stations 103, 105 and 107 appear in the drawing, to represent examples of the mobile stations that may receive various services via the network 100. The network may allow users of the mobile stations to initiate and receive telephone calls to each other as well as through the public switched telephone network (not shown). The signaling resources deployed to support voice services, however, also support SMS communications, as discussed later. For purposes of this discussion, the network 100 also enables any and all users of the mobile stations 103, 105 and 107 to initiate and receive various other forms of user traffic via packet switched data communications, for example to or from the public data network referred to as the Internet (not shown). The packet data communication capabilities of the network 100 also support the MMS service.

The mobile communication network 100 typically is implemented by a number of interconnected networks. Hence, the overall network 100 may include a number of radio access networks (RANs), as well as regional networks interconnecting a number of RANs and a wide area network (WAN) interconnecting the regional networks to core network elements, such as the MMSCs.

Physical elements of a RAN operated by one of the mobile service providers or carriers, include a number of base stations represented in the example by the base station (BS) 109. Although not separately shown, such a base station 109 typically comprises a base transceiver system (BTS) which communicates via an antennae system at the site of base station and over the airlink with one or more of the mobile stations 103, 105 and 107, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access network also includes a traffic network represented generally by the two-way arrow at 111, which carries the user communications for the mobile stations 103, 105 and 107. Individual elements such as switches and/or routers forming the traffic network 111 are omitted here form simplicity. For packet data communications, such as MMS communications, the traffic network 111 supports two-way packet communication of mobile station traffic between the base stations 109 and a Packet Data Serving Node (PDSN) 113. The PDSN 113 establishes, maintains and terminates logical links to the associated portion of the radio access network. The PDSN also supports point-to-point protocol (PPP) user data sessions with the mobile stations.

The PDSN 113 provides the packet routing function from the radio network formed by bases stations 109 and traffic network 111 to/from other packet switched networks, in the example, via a local private Ethernet 115 providing packet transport between network elements in a particular region. The regional IP backbone network 117 utilizes OSPF (Open Shortest Path First) as a routing protocol for Internet Protocol (IP) traffic. In the example, the IP routing elements in a particular region coupled for packet communication via the Ethernet 115 are configured as OSPF region 1 (117) in our example. The components in OSPF region 1 (117) include an access router 119 connected to the Ethernet 115, which provides packet routing connectivity to a wide area network (WAN) 121, which provides backhaul connectivity to other regions (not shown) as well as to various core network elements represented by elements 123 and 125 in the example. The illustrated example substantially represents a CDMA2000 3G type network, that is to say using PDSN type elements and/or OSPF type protocol for IP routing decisions in the regional IP backbone, although similar MMS communications may be implemented in other types of networks. The core network elements relating to the MMS service, will be discussed more, later.

In the example, the network 100 also includes one or more Short Message Service Centers (SMSCs) 127, in the local region. The SMSC 127 connects to the regional Ethernet network 115 as well as to a SS7 (Signaling System 7) type signaling network 129. The SS7 signaling network 129 provides out of band signaling for call set-up for mobile stations, via the radio access network, in accord with the SS7 protocol. However, the SS7 signaling network 129 also is available for IS41D type communication of SMS messages to the mobile stations. The SMSC 127, for example, may receive incoming IP message packets through the network 115, e.g. from a remote network similar to the network 100 and/or from the Internet (not shown) for delivery via the SS7 network 129, the base station 109 and a signaling channel over the air link to a destination mobile station. The SMSC 127 also supports mobile station to mobile station SMS message delivery.

The network 100 of FIG. 5 also supports multimedia messaging service (MMS). For that purpose, the network 100 includes one or more multimedia messaging service centers (MMSCs), two of which are shown at 131 and 133 in the drawing. The network will typically include gateway devices enabling the MMSCs to communicate via external networks, for example, to send and receive multimedia messages on behalf of the mobile stations to external servers and/or terminals via the Internet. Examples of such gateways are represented by the Short Message Peer-to-Peer (SMPP) protocol gateways (GWs) 135 and 137. In an implementation such as shown in the drawing, the MMSCs and gateways are implemented as core network elements. The MMSCs 131, 133 connect to the WAN 121 for packet communication with the OSPF regional networks (such as OSPF 1 network 117). Although they may be implemented in a variety of ways on one or more physical server platforms, the relevant standard calls for a MMSC to include a MMS relay functionality and a MMS server functionality. The number of relays and/or servers in a particular MMSC depends on the expected level of MMS service that the platform will support. Also, functions of the MMS relay and MMS server may be combined within a MMSC platform so as to appear as a single entity.

The MMSCs 131, 133 support client-server type multimedia communications with other host computers (not shown) via the SMPP GWs 135, 137 as well as peer-to-peer type multimedia communications for the users of mobile stations 103, 105 and 107 in the illustrated region as well as with mobile stations in other regions. Of note for purposes of this discussion, for a peer-to-peer type multimedia communication, multimedia user messages are sent from a user agent application on one user's terminal, such as 103 to a user agent application on one or more other user terminals such as 105, via one or more of the MMSCs 131, 133, regardless of the region or regions of operation of the two mobile stations.

As shown by the above discussion of FIG. 5, a typical implementation of a network offering store and forward type MMS service requires all MMS messages and related signaling to go through one or more of the MMSCs 131, 133. The MMSCs are centralized resources serving many regional networks. Hence, when deployed in the manner shown, each MMS communication originating at a mobile station entails communications from the local or regional network serving the sending station through the carrier's wide area network (WAN) 121 to the appropriate MMSC 131 or 133. For a mobile to mobile type message communication, the network 100 must then deliver the message to the appropriate destination mobile station. In such a case, one of the MMSCs 131, 133 sends the message through the WAN 121 to the appropriate regional network, which in turn delivers the message to the destination mobile station. In some cases, the delivery goes back through the same regional network.

Consider a picture service type MMS communication. A user of sending mobile station 103 takes a picture and decides to send that picture via MMS to another user's mobile station 105. The user sending the message enters the telephone number of the mobile station 105 in a destination field, on the MMS application display screen shown on the user's mobile station 103; and then the user hits the 'SEND' button. The originating mobile station 103 creates a HTTP message with MMS protocols, containing an identification of the mobile station 103, the destination telephone number of the mobile station 105, and the content (picture in this example). The mobile station 103 sends the HTTP message over the air to the base station 109, which forwards it to the PDSN 113. The message is routed through the Ethernet 115 and the access router 119 of OSPF region 1 (117) to the WAN 121; and through the WAN 121, the message is routed to one of the MMSCs such as 131 which serves customers associated with the OSPF region 1 and corresponding radio access networks.

For simplicity, we will assume that the MMSC 131 will handle delivery to the destination mobile station 105, without the need to communicate with another MMSC 133. Hence, the MMSC 131 executes the logic to determine whether or not to deliver the message as requested, e.g. whether the mobile stations 103 and 105 subscribe to MMS service, billing determination (prepaid or postpay) and the like. If the MMSC 131 determines to proceed with message delivery, it sends an acknowledgement back to the mobile station 103 and creates a billing record with regard to message transmission by the mobile station 103. The MMSC 131 also stores the MMS message content and generates a URI, for example, in the form of a URL, which points to the message in storage.

The MMSC 131 then sends a SMS message intended for the destination mobile station 105. The message includes the URI assigned to the message and the IP address of the MMSC 131. The MMSC sends the message through the WAN 121, the access router 117 and the Ethernet 115 to the SMSC 127. The SMSC 127 stores and reformats the message for IS41D communication and relays it via the SS7 network 129, the base station 109 and the airlink to the mobile station 105. The SMS message 'wakes-up' the MMS application (client) on the destination mobile station 105. The MMS application causes the mobile station 105 to send a HTTP GET message back through the network, using the IP address of the MMSC 113 as the destination address and containing the URI of the stored message. More specifically, this entails sending an IP packet communication to that IP address through the base station 109, the PDSN 113, the Ethernet 115 and the access router 119, and through the WAN 121 to the MMSC 131.

Part of the HTTP GET message will identify the type of device, that is to say the type of mobile station, of destination station 105. The MMSC 131 retrieves the identified message. Based on the device type, the MMSC 131 will access a transcoder function in or associated with the MMSC to convert the message (if necessary) to a format that is compatible with the device type of the destination mobile station 105. The MMSC 131 sends the MMS message (transcoded if/as necessary) back to the destination mobile station 105 as a packet transmission, that is to say through the WAN 121, the access router 119, the Ethernet 115, the PDSN 113, the base station 109 and over the air to the destination mobile station 105 in our example. If the communication is successful, the mobile station 105 displays the message to the user, and the mobile station 105 sends an acknowledgement back to the MMSC 131. In response to the acknowledgement, the MMSC 131 creates a billing record, with regard to message delivery to the destination mobile station 105.

In current commercial deployments, this MMS communication via the core MMSC applies for all MMS communications, including those between mobile stations of the customers of one particular carrier, even if as in our example, the origination and destination mobile stations are operating through the same regional network and/or even through the same base station. In other words, even if the message only needs to go across the room or down the street, the message and associated signaling goes back and forth through the entire network to one or more of the core MMSCs.

As shown by the outline of an exemplary MMS message communication above, both sending the message up from the mobile station 103 to the MMSC 131 and delivery from the MMSC 131 to the destination mobile station 103 entail signaling exchanges between the MMSC and the respective mobile stations, as well as the actual message transmissions. These communications consume valuable WAN resources. Also, support for substantial amounts of MMS traffic requires the carrier to deploy a substantial number of MMSCs with substantial message communication and storage capabilities. In a nationwide network of one large wireless carrier, support sufficient to handle current busy hour traffic has required deployment of nine MMSCs in three data farms at various locations around the United States. MMSC deployments are expensive. At least one carrier that provides MMS service has determined that the WAN and MMSC deployments run approximately $10,000 to support each 1 message per second of MMS traffic, using the approach outlined above.

It has been noted, that a substantial portion of MMS traffic (e.g. as much as 70%) is for communication of messages from mobile station to mobile station for customers of the same carrier. The remainder goes to/from stations of other carriers or to/from e-mail or involves communications with host computers or the like operating as application servers. To reduce the actual message traffic and to reduce the number of MMSCs, the network might be adapted to permit communications of MMS messages directly through the network between sending and receiving mobile stations.

United States Patent Application Publication No. 2006/0142029 to Shao et al., for example, provides a wireless network system that enables direct wireless delivery of a multimedia message from a first MMS user agent to a second MMS user agent. In operation, a MMS server receives a request to send a multimedia message to the second MMS user agent, from the first MMS user agent. The request includes an identification (ID) of the second MMS user agent. Based on the ID number of the second MMS user agent, the MMS server obtains an Internet address of the second MMS user agent from a core network. Then, the MMS server forwards the Internet address to the first MMS user agent to enable the first MMS user agent to wirelessly deliver the multimedia message directly to the second MMS user agent using the Internet address. With this approach, the MMS server or relay (e.g. of the MMSC) need not receive, store and forward the actual message containing the multimedia content(s). However, it is necessary to signal the MMS server (e.g. in the MMSC) with the identification of the destination (second user agent), obtain an IP address from the core network and the MMS server, and provide that address to the sending/originating station to facilitate the actual message communications between the two mobile stations. A central MMS message server is still needed for the mobile station to mobile station communication, and the signaling communications with that server still place a burden on the WAN or core network.

Hence a need still exists for a further improved a MMS message communication technique, which reduces communications via core network elements such as a MMSC or other MMS server, for mobile station-to-mobile station traffic.

SUMMARY

The teachings herein alleviate one or more of the above noted problems with existing MMS communications by providing technology for communication of MMS messages directly between mobile stations, that is to say without interaction with a MMS server or MMSC. The technology discussed in the detailed description, for example, encompasses various methodologies for supporting direct MMS message communication as well as programming for mobile stations (e.g. for an originating station or for a destination station) to implement direct mobile station-to-mobile station communication.

The advantage with this approach is that it saves network resources and MMSC costs by allowing clients (mobile stations) to communicate directly to each other in a relatively simple manner without the need for extensive signaling to core network elements such as a MMSC or other MMS server.

An exemplary method provides direct communication of a multimedia message service (MMS) message between mobile stations, through a wireless mobile communication network, without interaction with a MMS center of the network. In response to user operation of an originating mobile station to originate communication of the MMS message, a query is initiated to the wireless mobile communication network, to determine whether or not the destination is a mobile station of a subscriber of a carrier operating the wireless mobile communication network. If so, then the method involves sending a short message service (SMS) message notifying the destination mobile station of the availability of the MMS message. The SMS message provides an address for packet communication with the originating mobile station, and that message provides an identifier for use in retrieval of the MMS message. The SMS message is sent directly through the wireless mobile communication network from the originating mobile station to the destination mobile station, that is to say in a manner that does not involve any interaction with a MMS center of the network. In response to the SMS message, a packet message is sent using the address of the originating mobile station directly through the wireless mobile communication network from the destination mobile station to the originating mobile station. Again, direct communication essentially means that the message transits the network without interaction with a MMS center of the network. This packet message requests retrieval of the MMS message and uses the identifier for that request. The message also includes an address for packet communication with the destination mobile station. A packet message containing the MMS message is sent back, using the address of the destination mobile station. The packet message containing the MMS message is sent directly through the wireless mobile communication network from the originating mobile station to the destination mobile station, that is to say without interaction with a MMS center of the network.

As shown by the preceding description, where the destination is a mobile station of the carrier operating the network, the signaling between the mobile stations resolves any address issues between the two stations, without requiring any involvement of any MMSC, such as a central MMS server. Similarly, the transfer of the actual MMS message content directly between mobile stations avoids any communication with or use of resources at the MMSC. In some cases this may also reduce communication across a wide area network.

The method may be enhanced through inclusion of further steps. In one such further example, after the step of sending the packet message containing the MMS message to the destination mobile station, the method further comprises sending the MMS message from the destination mobile station to a node, in a regional portion of the wireless mobile communication network currently serving the destination mobile station. The node, for example, may be a network element capable of performing a transcoding function. The MMS message may or may not be transcoded, for example, depending on whether transcoding is necessary to change the message to a format that a particular destination mobile station type can decode or the destination device has the capability to decode the content in its original form. In any event, the MMS message is sent back from the node to the destination mobile station, for presentation of content of the MMS message to a user of the destination mobile station. Whether transcoded or not, the handling of the MMS message through the node in the regional portion of the network permits creation of at least one billing record for the communication of the MMS message from the originating mobile station to the destination mobile station.

Unlike prior MMS service implementations, the node having the transcoding capability is a regional network element (as distinct from any function of or at the MMSC). Communication with the node entails additional message transmissions, but only through the regional portion of the network. The routine forwarding of the message to that regional node facilitates billing from the regional node, rather than based on records generated by the MMS center, such as the MMSC or MMS server.

The method may also be extended handle one or more exception or failure cases. For example, when an intended destination is not a mobile station of a subscriber of the carrier operating the wireless mobile communication network, then the MMS message may be sent through the wireless mobile communication network from the originating mobile station to a MMS center of the network, for delivery of the other MMS message to the other destination, in a manner similar to that done in the existing MMS deployment. Issues also arise when a MMS message is not timely delivered from the originating station, e.g. within a set period. From the originating mobile station perspective, upon failure of a destination mobile station to request retrieval of an MMS message within a predetermined period of time following the sending of the SMS message, then the MMS message may be sent through the wireless mobile communication network from the originating mobile station to a MMS center of the network, for delivery of the other MMS message to the other destination mobile station.

From the destination mobile station perspective, upon determining at the destination mobile station that a MMS message has not been retrieved from the originating mobile station within a predetermined period, the destination station may send a SMS message directly through the wireless mobile communication network from the other destination mobile station to the originating mobile station without interaction with a MMS center of the network. This SMS message requests retrieval of the MMS message, for example, using the identifier received from the prior SMS notification message. However, this later SMS message also includes an address for packet communication with the other destination mobile station. Hence, the originating mobile station can send a packet message containing the other MMS message, using the address of the other destination mobile station, directly through the wireless mobile communication network without interaction with a MMS center of the network.

Aspects of the technology discussed in more detailed below may also take the form of a program product, such as an article of manufacture. Such an article comprises a machine readable storage medium and executable code, for a mobile station, embodied in the medium. Execution of the code by a processor causes the mobile station to implement functions relating to direct communication of one or more multimedia message service (MMS) messages through a wireless mobile communication network, without interaction with a MMS type message center or server of the network.

An example of one such article causes the mobile station to implement functions including sending a query to the wireless mobile communication network to determine whether or not a destination is a mobile station of a subscriber of a carrier operating the wireless mobile communication network. If so, then the mobile station sends a SMS message notifying the destination of the availability of an outbound MMS message. The SMS message provides an address for packet communication with the mobile station, and the SMS message provides an identifier for use in retrieval of the outbound MMS message. The SMS message is sent directly through the wireless mobile communication network from the mobile station to the destination, that is to say, without interaction with a MMS center of the network. The mobile station receives a packet message addressed to the mobile station, requesting retrieval of the MMS message using the identifier, directly through the wireless mobile communication network from the destination without interaction with a MMS center of the network. The received packet message requesting retrieval includes an address for packet communication with the destination. The mobile station in turn sends a packet message containing the MMS message, using the address of the destination. In this way, the message with the MMS content is sent back directly through the wireless mobile communication network from the mobile station to the destination without interaction with a MMS center of the network.

Another example of one such article causes the mobile station to implement functions including receiving a SMS message notifying it of the availability of an inbound MMS message and providing an address for packet communication with an originating mobile station. The SMS message also provides an identifier for use in retrieval of the inbound MMS message. In response to the received SMS message, the mobile station in this example sends a packet message using the address of the originating mobile station, requesting retrieval of the inbound MMS message using the identifier. The message requesting retrieval includes an address for packet communication with the mobile station. The SMS message and the packet request message are communicated directly through the wireless mobile communication network between the mobile station and the originating mobile station, that is to say, without interaction with a MMS center of the network. The mobile station functions in this example also include receiving a packet message containing the MMS message, addressed to the mobile station, directly through the wireless mobile communication network from the originating mobile station without interaction with a MMS center of the network. The mobile station then can present content of the MMS message to a mobile station user.

As shown by the above discussion, a number of functions are implemented by appropriate programming of a mobile station. The programmed mobile station may be the origination station or the destination station. Typically, each mobile station of a particular service provider or 'carrier' would be programmed with an appropriate application supporting both the originating and destination functions. For example, the application may correspond to an identified application type. The originating mobile station inserts a unique identifier in a 'from' field of the SMS message notifying the destination of the availability of the MMS message, and that identifier allows the destination mobile station to route the message internally to the appropriate application and to 'wake-up' that application if necessary.

Another example of the subject matter described below relates to another method involving transporting a packet message containing the MMS message through the wireless mobile communication network from an originating mobile station to a destination mobile station without interaction of either of the originating and destination mobile stations with a MMS center of the network. This method also entails receiving the MMS message from the destination mobile station at a node, in a regional portion of the wireless mobile communication network currently serving the destination mobile station. The node is a network element capable of performing a transcoding function. The node sends the MMS message back to the destination mobile station, for presentation of content of the MMS message to a user of the destination mobile station. However, responsive to handling of the MMS message at the node in the regional portion of the wireless mobile communication network, at least one billing record is created for the communication of the MMS message from the originating mobile station to the destination mobile station.

This method supports direct mobile station-to-mobile station communication of an MMS message, for example, where both mobile stations obtain service from the same carrier operating the wireless mobile communication network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is a simplified functional block diagram of an existing network providing various mobile communication services, including store and forward MMS message communications via core MMSCs, including for MMS message communications between mobile stations.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The examples discussed below provide MMS message communication directly from an originating mobile station to a terminating or destination mobile station, that is to say via a packet communication through a wireless mobile communication network, but without interaction with a MMS center of the network. A number of aspects of the direct mobile station-to-mobile station (MS-to-MS) type MMS communication are implemented by client applications executed in the mobile stations. However, the network provides transport, and some procedures and functions are modified and/or moved to support the direct mobile station-to-mobile station communication. To fully appreciate the improvements in MMS communications and techniques for implementing such improvements, it may be helpful to discuss examples in the context of an exemplary wireless mobile communication network.

Figure 1:
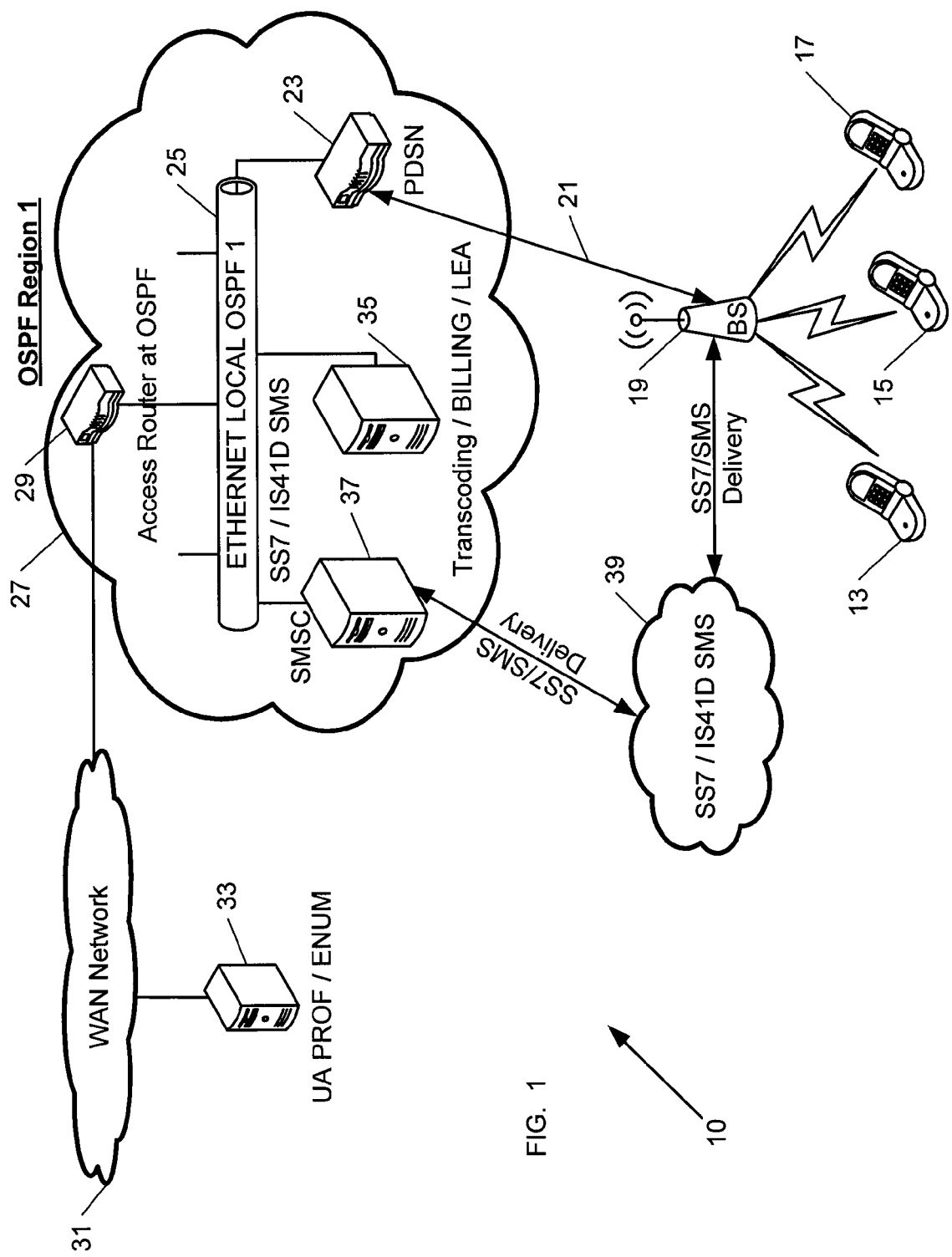
FIG. 1 is a simplified functional block diagram of a wireless mobile communication network offering direct mobile station-to-mobile station communication of MMS messages, between mobile stations operating in the same region.

Hence, reference now is made in detail to the example illustrated in FIG. 1, which is a simplified functional block diagram of a wireless mobile communication network 10 offering direct mobile station-to-mobile station communication of MMS messages, between mobile stations operating in the same area or region.

As shown, the communication network 10 may provide mobile voice telephone communications and short message service, as well as packet data services, for numerous mobile stations. For purposes of later discussion, mobile stations 13, 15 and 17 appear in the drawing, to represent examples of the mobile stations that may receive various services via the network 10. Today, such mobile stations typically take the form portable handsets, smart-phones or personal digital assistants, although they may be implemented in other form factors.

The network 10 may allow users of the mobile stations to initiate and receive telephone calls to each other as well as through the public switched telephone network (not shown). The signaling resources deployed to support voice services, however, also support SMS communications, as discussed later. The network 10 also enables any and all users of the mobile stations 13, 15 and 17 to initiate and receive various other forms of user traffic via packet switched data communications, for example to or from the public data network referred to as the Internet (not shown). Of note for purposes of this discussion, the packet data communication capabilities of the network 10 also support MMS service. The MMS service may involve multimedia message communications with host computers/servers and with mobile stations in other regions or on other networks, but the example shown will focus on the large portion of MMS message traffic that is exchanged between mobile stations, in this first example, between mobile stations operating through the same regional portion of the network 10.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as the MMSCs. A regional portion of the network 10, such as that serving mobile stations 13, 15 and 17, will typically include one or more RANs and a regional packet network and may include additional signaling network facilities.

Physical elements of a RAN operated by one of the mobile service providers or carriers, include a number of base stations represented in the example by the base station (BS) 19. Although not separately shown, such a base station 19 typically comprises a base transceiver system (BTS) which communicates via an antennae system at the site of base station and over the airlink with one or more of the mobile stations 13, 15 and 17, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access network also includes a traffic network represented generally by the two-way arrow at 21, which carries the user communications for the mobile stations 13, 15 and 17. Individual elements such as switches and/or routers forming the traffic network 21 are omitted here form simplicity. For packet data communications, such as MMS communications, the traffic network 21 supports two-way packet communication of mobile station traffic between the base stations 19 and a Packet Data Serving Node (PDSN) 23. The PDSN 23 establishes, maintains and terminates logical links to the associated portion of the radio access network. The PDSN also supports point-to-point protocol (PPP) user data sessions with the mobile stations.

The PDSN 23 provides the packet routing function from the regional radio access network formed by a number of base stations 19 and traffic network 21 to/from other packet switched networks, in the example, via a local private Ethernet 25 providing packet transport between network elements in a particular service area or region. The regional IP backbone network 27 utilizes OSPF (Open Shortest Path First) as a routing protocol for Internet Protocol (IP) traffic. In the example, the IP routing elements in a particular region coupled for packet communication via the Ethernet 25 are configured as OSPF region 1 (27) in our example. The components in OSPF region 1 (27) include an access router 29 connected to the Ethernet 25, which provides packet routing connectivity to a wide area network (WAN) 31, which provides backhaul connectivity to other regions (not shown) as well as to various core network elements. The illustrated example substantially represents a CDMA2000 3G type network, that is to say using PDSN type elements and/or OSPF type protocol for IP routing decisions in the regional IP backbone. Those skilled in the art will recognize that the present teachings are applicable to other types of networks such as GSM or UMTS, that is to say using other elements and/or other protocols in the regional IP backbone. Core network elements relating to the MMS service, will be discussed more, later.

Since the discussion of FIG. 1 focuses on direct MMS communications between mobile stations, without interaction with a MMSC (or other MMS center type elements similar to the MMS server or MMS relay of a MMSC), core elements that may support other types of MMS communications are omitted from the illustration. In practice, such core MMS elements would still be included for some MMS communications. MMS communications that extend outside the network 10, e.g. to host computers or to mobile networks of other carriers would still utilize MMSC functionality essentially as they do today. Also, as discussed more later, some exceptions or fail-over handling in the direct mobile station-to-mobile station communications may fall back on relay through a MMSC.

A Mobile Directory Number (MDN) is the telephone number assigned to a mobile station, which a calling party or device inputs in order to call or send a message to the particular mobile station. To send a MMS message or a SMS message to destination mobile station 15, for example, typically entails input of the MDN of that mobile station. A Mobile Identification Number (MIN) is an identification number used by the network 10 to signal the mobile station. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile station.

In the illustrated example, the core elements include a database 33 used to determine if intended MMS message destinations are mobile stations of users subscribing to services from the carrier operating the network 10 and/or the service provider offering MMS service through that network. The determination is based on a lookup of a record for the destination mobile station using an identifier of that station, such as the assigned MDN. The database 33 may be a UAProf type database. The UAProf database stores profile records of User Agent (UA) devices for the particular carrier operating the network 10. Alternatively, the database 33 may be an ENUM (tElephone NUmber Mapping) or similar database of directory numbers for the mobile stations of the carrier's subscribers. Of note for purposes of this discussion, the database 33 stores the mobile directory number (MDN) and device type information for each mobile station of a customer of the carrier that operates the network 10 and in this case provides the MMS service. The database 33 is accessible to network elements coupled to the OSPF Region 1 (27) and typically to network elements coupled to several other regional portions of the network 10, via the WAN 31. In practice, a large network deployment (e.g. nationwide) will include a number of instances of the UAProf or ENUM type database 33 coupled to the WAN.

As discussed in more detail below, an originating mobile station such as station 13 intending to send a MMS message will access the database 33 to determine whether or not the destination is a mobile station of a subscriber of a carrier operating the wireless mobile communication network. For example, if the MDN of a destination mobile station 15 points to a user agent profile or record in the database 33, then the mobile station 15 is that of a subscriber of the carrier or service provider operating the network 10; and the database 33 can so advise the originating mobile station 13 to facilitate its direct MMS message communication with that destination mobile station 15.

In the existing network of FIG. 5, transcoding functionality was implemented in or associated with the MMSC. However, a large portion of MMS traffic will go through the network 10 (FIG. 1) directly between mobile stations, that is to say, without any interaction with a MMSC of the network. Hence, the network 10 of FIG. 1 includes computer platforms in the regional portions of the network, serving as nodes for performing the transcoding function. Hence, in the illustrated example, the packet communication elements in the regional portion of the network 10 forming the OSPF Region 1 (27) include a node 35 capable of performing the transcoding function.

As discussed more later, this node 35 may also create billing records for direct mobile station-to-mobile station traffic. For example, the transcoding node 35 may generate billing records for the sending/originating mobile station and for the receiving/destination mobile station, for each delivery of an MMS message directly between two such mobile stations. In one implementation, the node 35 performing the transcoding function could be implemented as a server or other computer located in the mobile telephone switching office (MTSO) with a MSC (mobile switching center not shown) that performs some of the switching/routing functions of the traffic network 21 and/or with the PDSN 23. The transcoding function is generally similar to transcoding previously performed by or in association with MMSCs. However, in the network 10, the transcoding function is implemented at the node 35 within regional portion of the network 10 rather than in the core.

The node 35 may also provide other functions, such as reporting or message intercept for a law enforcement agency (LEA). If the carrier is required to provide usage reporting and/or actual message content to a law enforcement agency (LEA), the requisite functionalities could also be implemented at the node 35, since that node handles the MMS message for any necessary transcoding and generates the billing records regarding MMS usage by the various parties involved in the direct MS-to-MS communication.

In the example, the network 10 also includes one or more Short Message Service Centers (SMSCs) 37, in the local regional portion of the network. The SMSC 37 connects to the regional Ethernet network 25 as well as to a SS7 (Signaling System 7) type signaling network 39. The SS7 network 39 typically includes a number of switching or routing elements, referred to as signaling transfer points (not shown) and links between those points and various switching offices, servers or database elements connected for and capable of SS7 signaling. The SMSC 37, for example would connect over a SS7 link to one of the signaling transfer points. Although shown as SS7 communication directly to/from the base station (BS), in practice, that SS7 communications link extends to/from the associated central office facility such as a Mobile Switching Center (MSC) at a Mobile Telephone Switching Office (MTSO) of the regional traffic network 21, and that facility provides signaling communications to/from the BS. The facility also provides the traffic transport to/from the PDSN 23. The MSC or the like facility has been omitted from the drawing for convenience.

The SS7 signaling network 39 provides out of band signaling for call set-up for mobile stations, via the radio access network, in accord with the SS7 protocol. However, the SS7 signaling network 39 also is available for IS41D type communication of SMS messages to the mobile stations.

The SMSC 37 and IS41D type communication through the SS7 signaling network 39 support a variety of different types of SMS message communications services. The SMS services include a variety of text message communications to or from mobile stations 13, 15 and 17. The SMSC 127, for example, may receive incoming IP message packets through the network 25, e.g. from a remote regional portion of the network, from another carrier's network similar to the network 10 and/or from the Internet (not shown) for delivery via the SS7 network 39, the base station 19 and a signaling channel over the air link to a destination mobile station. The SMSC 37 also supports mobile station to mobile station SMS message delivery, in this case between mobile stations of parties who subscribe to service from the carrier that operates the network 10. Of note for purposes of this discussion, SMS communications can be used for some of the signaling communications related to MMS traffic. Since, SMS communications can extend from one mobile station to another, this permits signaling in support of MMS traffic directly from one mobile station to another mobile station, without the need for interaction with an MMSC or the like.

A direct communication of a MMS message between mobile stations, such as 13 and 15 through the wireless mobile communication network 10, need not involve any interaction with a MMSC (or other core MMS center type element such as a MMS server or MMS relay) of the network.

MMS communication requires that a mobile station is logged on or registered with the network 10, for packet data type communication services. In our example, the sending station 13 logs-into the network 10 for data service and obtains an IP address assignment, in the normal manner, e.g. through interaction with the PDSN 23 and registration through that interaction with an authentication, authorization and accounting (AAA) server (not shown). As part of its log-in, the mobile station 13 receives an IP address assignment. Then, the station is capable of sending and/or receiving MMS messages through the network. The destination station 15 may be logged on for packet communications, either because it is an 'always on' device or because it was logged in for other IP communications prior to the message communication from the originating station 13. Alternatively, the signaling regarding the MMS communication may 'wake up' an application in the destination station and cause that station log on for packet communications and obtain an IP address assignment.

Upon user operation of the originating mobile station 13 to originate communication of a new MMS message, the mobile station 13 sends a query to the wireless mobile communication network 10, e.g. to the database 33, to determine whether or not the destination is a mobile station of a subscriber of the carrier operating the wireless mobile communication network. If so, then the originating mobile station 13 sends a SMS message notifying the destination mobile station 15 of the availability of the MMS message. SMS routing relies on the regular numbers identifying the destination station, e.g. its MDN, and involves signaling communications via the SS7 signaling network 39, without IP packet routing and without interaction with a MMSC.

However, the SMS message contains the IP address that station 13 obtained for the packet communication with the originating mobile station 13. The SMS message also contains an identifier for use in retrieval of the MMS message, typically, an identifier assigned to the message by a MMS application running on the originating mobile station 13. The SMS message is sent directly through the wireless mobile communication network from the originating mobile station 13 to the destination mobile station 15, that is to say in a manner that does not involve any interaction with a MMS center of the network.

In response to the SMS message, the destination mobile station 15 sends a packet message using the IP address of the originating mobile station 13 through the wireless mobile communication network 10 to the originating mobile station 13. Again, the communication flows directly through the network 10, that is to say that the message transits the network 10 without interaction with a MMS center of the network.

This packet message requests retrieval of the MMS message and uses the identifier for that request. The message also includes an IP address, for packet communication with the destination mobile station 15. In response to the retrieval request, the originating mobile station 13 uses the IP address of the destination mobile station 15 to send a packet message containing the MMS message back through the network 10 to the destination mobile station 15. The packet message containing the MMS message transits directly through the wireless mobile communication network 10 from the originating mobile station 13 to the destination mobile station 15, that is to say without interaction with a MMS center of the network.

As shown by the preceding description, where the destination is a mobile station 15 of the carrier operating the network 10, the signaling between the mobile stations 13 and 15 resolves any address issues between the two stations, without requiring any involvement of any MMSC, such as a central MMS server. Similarly, the transfer of the actual MMS message content directly between mobile stations avoids any communication with or use of resources at the MMSC, such as an MMS relay.

However, the MMSC in the existing methodology also implemented other functions, such as transcoding and billing. In the new approach of FIG. 1, these functions are moved into the regional portion of the network that is serving the destination mobile station 15, that is to say into node 35 in the OSPF Region 1 (27) in our first example.

Hence, in the MMS communication example discussed above, after the originating station 13 sends the packet message containing the MMS message to the destination mobile station 15, that station 15 sends the MMS message to the node 35, in the regional portion of the wireless mobile communication network 10 currently serving the destination mobile station 15. The transcoding node 35 determines whether or not transcoding is necessary, for the particular MMS content. For example, based on the device type of the destination mobile station 15, the node 35 will determine if that station is capable of decoding the message content. If so, the node 35 can simply send back the MMS message. If the destination mobile station 15 is not capable of decoding the message content information in its original form, the node 35 transcodes the content into a form that the mobile station 15 can decode; and then the node 35 sends back the transcoded message content. In any event, the MMS message is sent back from the node 35 to the destination mobile station 15, for presentation of content of the MMS message to a user of the destination mobile station 15.

Whether transcoded or not, the handling of the MMS message through the node permits creation of at least one billing record for the communication of the MMS message from the originating mobile station 13 to the destination mobile station 15. For example, the node 35 may generate a billing record for the originating mobile station 13 for having sent the MMS message, and the node 35 may generate a billing record for the destination mobile station 15 for having received the MMS message. Such records may be sent to a central billing system (not shown) operated by the carrier, for further processing to generate the actual bills to be sent to the respective subscribers.

Unlike prior MMS service implementations, the node 35 having the transcoding capability is a regional network element (as distinct from any function of or at the core MMSC). The routine forwarding of the MMS message to that regional node 35 facilitates billing from the regional node, rather than based on records generated by the MMSC or the MMS server or relay at the network core.

It is assumed that those skilled in the art are familiar with the structure and operation of various mobile stations such as those shown at 13, 15 and 17 in FIG. 1. The discussion herein focuses on direct mobile station-to-mobile station communication of MMS messages, some aspects of which are implemented as functions of the originating and destination (or terminating) mobile stations. Hence, to insure a full understanding by all readers, it may be helpful for at least some readers to consider a high level summary review of the relevant structure and programming of one example of a mobile station.

Figure 2:
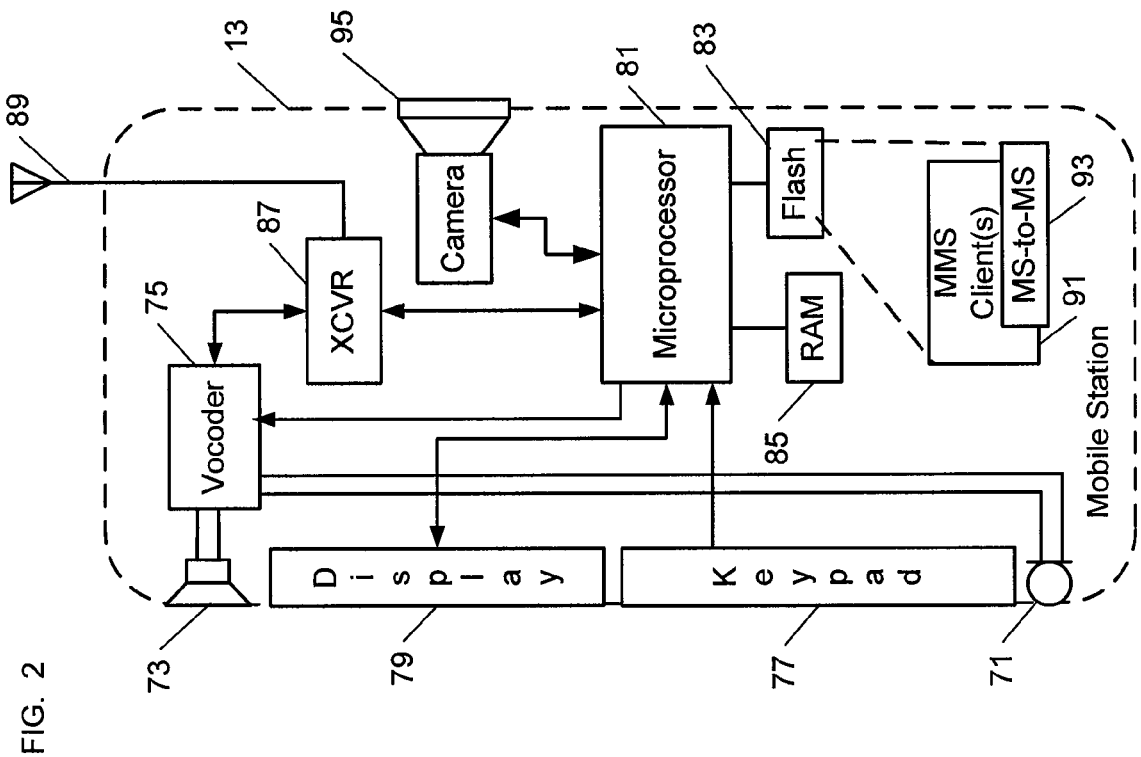
FIG. 2 is a simplified functional block diagram of a mobile station configured to implement the direct mobile station-to-mobile station communication of MMS messages.

FIG. 2 is a block diagram, illustrating exemplary functional elements of one of the mobile stations that may be involved in a direct MMS message exchange between two mobile stations, for example, in the network of FIG. 1. For discussion purposes, the diagram uses mobile station 13 as the example for illustration of a possible architecture of a mobile station. For purposes of the example of FIG. 2, the mobile station 13 may be either an originating station or a destination station, and in practice, that one station will actually send (originate) and receive (terminate as the destination) different messages at various times.

Although the station 13 may be incorporated into a vehicle mounted mobile unit or into another device, such as a portable personal computer or PDA, for discussion purposes the illustration shows the station 13 in the form of a handset. The handset embodiment of the mobile station 13 functions as a normal digital wireless telephone station. For that function, the station 13 includes a microphone 71 for audio signal input and a speaker 73 for audio signal output. The microphone 71 and the speaker 73 connect to voice coding and decoding circuitry (vocoder) 75. For a voice telephone call, for example, the vocoder 75 provides two-way conversion between analog audio signals representing speech or other audio and digital samples at a compressed bit rate compatible with the digital protocol of the wireless communication network 10.

As shown, the digital telephone handset 13 includes a keypad 77 and a display 79, for user input and output purposes. The display 79 for example permits display of SMS and/or MMS messages, a menu or other MMS application screen(s), web pages generated by a client browser program or the like, as well as call related information such as dialed and calling party numbers, etc. The keypad 47 enables input dialing digits for voice and/or data calls (including MMS destination identifiers/numbers) and generating selection inputs keyed by the user based on the displayed menu. These elements are also used for display of menus and other information to the user and user input of selections, for the applications relating to the MMS message communication, for example, for selection of a stored picture for attachment as part of the content of an MMS message. Of course other user interface elements may be used, such as a stylus and touch sensitive display screen, as in a PDA. Of course, the mobile station may include other inputs, such as a digital camera (not shown) for image input purposes.

For digital wireless communications, the handset 13 also includes a digital transceiver (XCVR) 87. The concepts discussed here encompass embodiments of the station 13 utilizing any digital transceivers that conform to current or future developed digital wireless communication standards, such as 1x-EVDO or GPRS, although the XCVR 87 may in addition or instead support other wireless communications. The digital transceiver (XCVR) 87 provides voice communications, attendant signaling, SMS communications over the signaling resources of the airlink as well as packet data communications. The transceiver 87 provides two-way wireless communication of information, such as vocoded speech samples and various digital message information. The transceiver 87 also sends and receives a variety of signaling messages in support of the various services provided via the mobile station 13 and the network 10. The transceiver 87 connects through RF send and receive amplifiers (not separately shown) to an antenna 89. The mobile station 13 may include one or more additional transceivers (not shown) for operation in an analog mode or in accord with an alternative digital standard.

A microprocessor 81 controls all operations of the handset implementation of the mobile station 13. The microprocessor 81 is a programmable device. The mobile unit 13 also includes flash type program memory 83 and/or a non-volatile random access memory (RAM) 85, for storing various software routines and mobile configuration settings, such as mobile identification number (MIN), etc. In a present implementation, the program memory 85 stores an operating system, vocoder software, client browser software, device driver software, call processing software and short message service software. As discussed more later, the stored software will also include at least one MMS application 91, 93 for use in MMS message communications, including direct mobile station-to-mobile station type MMS message communications. The memories also store data, such as telephone numbers server addresses and data input by the user via the keypad 77, for example, including telephone numbers or other identifiers for various MMS destinations. The stored data will also include multimedia message content as well as addresses and location identifiers used during MMS message communications.

The mobile station 13 has the capabilities necessary to send and receive MMS messages, that is to say, to send and receive messages that may include any combination of multimedia objects (images, audio, video, rich text, etc). For that purpose, various types of multimedia objects can be input and then stored in one or more of the device memories (additional memories not shown may be provided for additional storage capacity for image files and/or other multimedia content); and various types of multimedia objects can be retrieved from device memory, processed and then presented to the user via appropriate output element(s) of the mobile station 13. For example, text input and output for such messages may be provided via the keypad 77 and the display 79; and audio input and output for such messages may be provided via the vocoder 75 in combination with the microphone 71 and the speaker 73.

In the illustrated example, the mobile station 13 also includes a digital camera 95, for input of still pictures and/or video clips. The user for example may operate one or more keys of the keypad 77 to take a still picture, which essentially activates the camera 95 to create a digital representation of an optical image visible to the image sensor through the lens of the camera. The camera 95 supplies the digital representation of the image to the microprocessor 81, which stores the representation as an image file in one of the device memories. The microprocessor 81 may also process the image file to generate a visible image output as a presentation to the user on the display 79, when the user takes the picture or at a later time when the user recalls the picture from device memory.

Hence, multimedia objects input on the mobile station 13 are stored in device memory. The stored objects may be sent via MMS message communication. The image file in memory, in the picture example, would be available for selection and transmission with or as part of an MMS message transmission.

The mobile station 13 also receives multimedia content via the antenna 89 and the transceiver 87, for example, in MMS type messages. The microprocessor 81 stores the received multimedia content as one or more files in one of the device memories, and can process the content for presentation to the user. Text would be processed and output via the display. An audio file or the audio associated with a video clip could be decoded by the microprocessor 81 or the vocoder 75, for output to the user as an audible signal via the speaker 73. As another example, if a received multimedia object is an image file, upon command from the user, the microprocessor 81 would process the received image file from memory storage to generate a visible image output for the user on the display 79. Video images could be similarly processed and displayed.

As noted, the executable code for the mobile station stored in the memory 83 includes at least one MMS client program 91, for execution code by the microprocessor of the mobile station 13. In the example, the client software in the flash memory 83 includes a separate MMS client application 93 for mobile station (MS) to mobile station (MS) type MMS message communication. The MMS device application 93 could be written in JAVA or BREW. The application 93 may be initially installed on the mobile stations (e.g. by the device manufacturer) or may be downloaded as an upgrade using known techniques. Initially application deployment may target always-on type devices (e.g. Blackberries, iPhones and other smart phone devices), because the always on devices retain IP addresses longer which reduces wake-up activity and because typically such devices generate a disproportionate amount of the MMS message traffic. Over time, however, the application 93 may be deployed to virtually all MMS capable mobile station devices of subscribers of the carrier that is providing the MMS service through the network 10.

When the user activates the mobile station 13 to send a MMS message, it will activate the application 93 for direct mobile station-to-mobile station (MS-to-MS) type MMS communication. If the device has a regular MMS application, such as application 91, the station to station application would be activated first. Alternatively, the station to station communication functionality could be written as part of a combined MMS application, however, the application would still initially implement at least some of the MS-to-MS related functions in a preferential manner and only fall-back on regular MMS functionality in the event that the MS-to-MS functions will not serve to deliver the message in a particular instance.

As discussed more later, the application 93 for direct mobile station-to-mobile station (MS-to-MS) type MMS communication will have a unique application identifier. The application 93 may cause the mobile station to include the identifier in one or more messages that the station sends. Also, the functionality of the mobile station (e.g. as implemented by lower layer programming of the device) may logically route messages to or even 'wake-up' the application 93 in response to inclusion of the unique application identifier in an incoming message.

The structure and operation of the mobile station 13, as outlined above, were described to by way of example, only.

Figure 3:
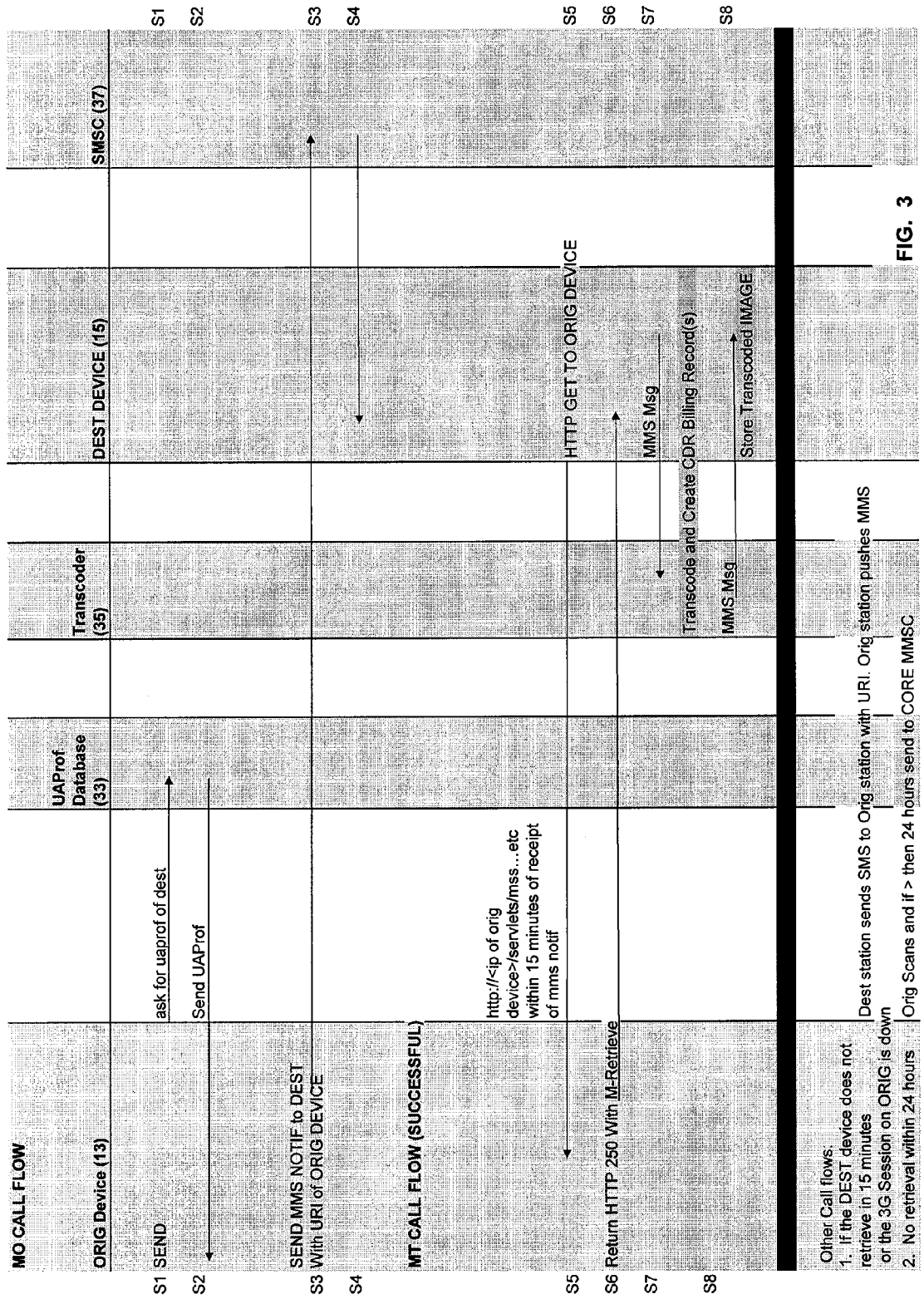
FIG. 3 is a call flow diagram, illustrating signal flow involved in a direct MMS message exchange between two mobile stations, for example, in the network of FIG. 1.

The earlier discussion of FIG. 1 provided a summary discussion of a direct mobile station-to-mobile station or MS-to-MS type MMS communication. However, it may be helpful at this point to consider an example of a call or signal flow of a mobile station (MS) to mobile station (MS) type MMS message communication, in somewhat more detail. FIG. 3 is a simplified signal flow diagram of a direct MS-to-MS type communication. The top portion (steps S1 to S4) represent the initial mobile originated (MO) steps, whereas the next portion (steps S5 to S8) represent the subsequent steps to deliver or terminate the message at the destination mobile station and thus may be referred to as the mobile terminated (MT) portion of the process. The flow of the illustrated call (steps S1 to S8) assumes successful delivery to the destination station. However, a few notes appear at the bottom of the drawing (below the representative signal flows), relating to scenarios in which the initial attempt to deliver the message is in some way unsuccessful.

The signaling exchange illustrated by way of example is between a number of the elements shown in FIG. 1, and like reference numerals have been used to designate such elements at the top of FIG. 3. For example, for this discussion, we will assume that the mobile station 13 is the originating device and the mobile station 15 is the destination device.

For purposes of discussion of the process flow of FIG. 3, consider again an example in the form of a picture service type MMS communication. A user of the sending mobile station 13 operates the camera 95 to take a picture and decides to send that picture via MMS to another user's mobile station 15. The user activates the mobile station 13 to select the MMS service, which in this case, initially activates the MS-to-MS application 93. The application 93 opens a new message screen on the display 79 of the mobile station 13. In that new message display, the user enters a telephone number for the intended destination, in this example, the mobile directory number (MDN) of the destination mobile station 15. The user also activates the station 13 to attach the picture that the user intends to send from storage in one of the memories; and then the user hits the 'SEND' button on the keypad 77.

Although not separately shown, the originating station 13 will be registered on the network 10 for packet type communications and will have been assigned an IP address for packet type communications, including for MMS service, for example, by registering through a PDSN 23 with an authentication, authorization and accounting (AAA) server and then obtaining an IP address from the PDSN. The registration and attendant address assignment may have occurred earlier, but if not, then the activation of the MMS application 93 will cause the mobile station 13 to so register and obtain an IP address for its use in MMS communication.

For purposes of this discussion, we will assume that the input destination address is a telephone number, e.g. a ten-digit number string in the US. If the user inputs a different type of destination ID, e.g. an e-mail address or an address of a picture server, the mobile station 13 activates the regular MMS application 91 and sends the message to an MMSC for delivery to the appropriate e-mail destination or uploading to the picture server.

In the example where the input destination identifying information is a telephone number, in response to the 'SEND' activation, the MS-to-MS application 93 causes the originating mobile station 13 to initially send a query to a network number database 33 (step S1). The MS-to-MS application 93 is programmed (e.g. with an IP address or a Domain Name) to provide the address information needed to send a message, in this case a query, to the database 33. The database may be an ENUM or similar database of directory numbers for the mobile stations of the carrier's subscribers, but in the example of FIG. 3, the database 33 is a UAProf type database. The UAProf database stores profile records of User Agent (UA) devices for the particular carrier operating the network 10. Of note for purposes of this discussion, the database stores the MDN and device type information for each mobile station of a customer of the carrier that operates the network 10 of FIG. 1. The query sent in step S1 may take the form of a relatively simple User Datagram Protocol (UDP) query containing the destination MDN input by the user.

Essentially, the query here allows the originating mobile station 13 to ask the UAProf database 33 whether or not that database contains a user agent profile or record corresponding to the destination number. If the MDN in our example corresponds to a mobile station 15 of a subscriber of the carrier or service provider operating the network 10, then the UAProf database 33 will contain a record for the MDN.

If the MDN or other destination number in the query is not in the database, then the destination is not a mobile station of a subscriber of the carrier or service provider. The destination may be a mobile station of a customer of another carrier or some other type of destination. If the destination number is not identified in the UAProf database 33, then the database informs the mobile station 13, which activates the normal MMS application 91 and uses the existing MMS procedures to send the message to/through an MMSC, essentially as discussed above relative to FIG. 5.

Assume now for purposes of further discussion here that the MDN identified in the UDP query has a record in the UAProf database. Hence, the UAProf database 33 sends back an affirmative answer to the mobile station 13, in step S2.

In response to the affirmative determination indicated at S2 that the destination mobile is a device of one of the carrier's customers, the mobile station 13 creates a SMS message intended for the destination mobile station 15. The message is addressed to the MDN of that destination station. The message is formatted as a MMS notification type SMS message, similar to that sent by the MMSC in the example of FIG. 5. Every SMS message includes a "from" field. In the process of FIG. 3, the MS-to-MS application 93 causes the originating mobile station 13 to insert a unique identifier of that type of application in the "from" field of the SMS message, to distinguish the MS source from other types of sources such as a MMSC. When the SMS message containing the notification of an available MMS message reaches the destination, the encoded message with the indicator that the notification is from the MS-to-MS type MMS application serves to wake-up or otherwise notify an appropriate MMS application in the destination mobile station 15, for example, another instance of the MS-to-MS application 93 in that station 15.

To conduct packet communications via the network 10, such as MMS communications, the originating mobile station 13 will have previously logged-in and after authentication will have received an IP address. The log-in may have occurred when the user activated the MMS application (at or before step SI) or at an earlier time, either for an earlier MMS communication or an earlier data communication of another type (e.g. Internet browsing) or because the station 13 is "always on" with respect to MMS and/or other packet services. When the mobile station 13 generates the SMS message for MMS notification, the station 13 includes its own assigned IP address in that notification message.

The MS-to-MS application 93 also causes the mobile station 13 to generate a URI, identifying the MMS resource, in this case, the new MMS message from the sender with the attached picture which now resides in memory in the mobile station 13. When the mobile station 13 generates the SMS message for communication in step S3, the station 13 includes the URI in that SMS message.

At step S3, the mobile station sends the SMS message to the SMSC 37, essentially as it would any other SMS message. In the example shown in FIG. 1, such a communication would entail sending the message over the air on the appropriate channel to the base station 19 serving the originating mobile station 13. The base station in turn forwards the message, and the SS7 network 39 routes the message to the SMSC 37. Using normal SMS procedures, the SMSC forwards the message to the destination mobile station 15 (step S4). In the example of FIG. 1, the SMSC 37 sends the SMS message via the SS7 network 39 to a central office facility (e.g. an MSC not separately shown) which forwards the message over signaling resources to the base station 19 serving the destination mobile station 15, which in turn transmits the message over a forward signaling channel on the airlink to that mobile station. In the illustration, the base station 19 is the same as that serving the originating mobile station 13, although obviously the mobile station 15 may be receiving service through a different base station of the network 10, although for purposes of this example (FIGS. 1 and 3) we are assuming that the mobile station is within the same regional portion of the network (all packet communications through the same OSPF region in the example).

For purposes of this discussion, the SMS message communication is 'direct' between the two mobiles stations in that it does not go through any MMSC, although obviously it does go through any number of other network elements.

Based on the formatting or encoding of the SMS message as a MMS notification and the MS-to-MS type identifier in the "from" field, the mobile station 15 internally supplies the message contents to an appropriate MMS application. This may be a corresponding MS-to-MS type application similar to the application 93 in the originating mobile station 13. The MMS application in the mobile station 15 may be awakened by the message if not previously active. The MMS application extracts the IP address of the originating mobile station 13 and the URI of the particular message from the contents of the SMS message. If the mobile station 15 was not previously active for MMS service (and/or the station was not active for another type of IP service), then the activation of the application will cause the mobile station 15 to log into the network 10 for IP packet type service and obtain an IP address assignment, for its own use in IP packet communications.

The SMS communication itself does not involve an IP packet communication or service through the network 10. A SMS message is routed based on MDN and/or associated MIN. Such routing does not need an IP address for the destination mobile station 15. However, that station will have or obtain an IP address, but at this point, the originating mobile station 13 has not learned that IP address. The destination mobile station 15 need not previously know the IP address of the originating mobile station 13 or access any core network element to learn that address. Instead, the MMS notification message contained within the SMS message sent to the destination device in steps S3 and S4 contains the IP address currently assigned to the originating mobile station 13, to allow the destination mobile station 15 to initiate an IP packet communication back directly through the network 10 to the originating mobile station 13, which also provides the IP address of station 15 to station 13.

As noted above, the MMS notification type SMS message includes the URI of the MMS message, in the originating mobile station. Hence, the MMS application in the destination device 15 causes that mobile station 15 to send a HTTP GET message back through the network, using the IP address of the originating mobile station 13 and containing the URI of the stored message as well as the IP address of the destination mobile station 15 (step S5). More specifically, this message transmission entails sending an IP packet communication to the address of station 13 through the base station 19, the PDSN 23, back to the base station serving the originating mobile station (in this simple example, again the base station 19) and over the airlink to the originating mobile station 13. The HTTP GET message goes directly to the originating mobile station 13 in that there is no communication or interaction with any MMSC, although obviously it does go through any number of other network elements.

Based on the URI, the originating mobile station 13 retrieves the MMS message intended for the destination mobile station 15. The MS-to-MS application causes the mobile station 13 to formulate a Return HTTP 250 with M-Retrieve message. This return message contains the actual MMS message content(s) and is addressed to the destination mobile station 15 using that station's IP address (obtained from the HTTP GET message received at S5). At step S6, the originating mobile station 13 sends the Return HTTP 250 with M-Retrieve message back through the network 10 to the destination mobile station 15. In our example, this entails sending one or more IP packets to the IP address of station 15 through the base station 19, to the PDSN 23, from the PDSN 23 back to the base station serving the originating mobile station (in this simple example, again the base station 19) and over the airlink to the destination mobile station 15. The Return HTTP 250 message goes directly to the destination mobile station 15 in that there is no communication or interaction with any MMSC, although obviously it does go through any number of other network elements.

The destination mobile station 15 can now store and process the MMS message. As shown by the discussion of the signal flow so far, there has been no consideration of whether or not transcoding is needed and no billing records have been created. Hence, in the example of FIG. 3, before displaying the MMS message contents to the user, the destination mobile station 15 sends the MMS message as a packet communication through the network 10 to the node 35 in the regional portion of the network 10 that implements the transcoding functionality (step S7). The MMS application would be preprogrammed with an address of a transcoding facility, which can be resolved to point to the node in the regional portion of the network currently serving the mobile station 15 (e.g. via a DNS translation or the like). In the example of FIG. 1, the mobile station 15 sends one or more IP packets containing the MMS message and addressed to the appropriate node 35 over the air to the serving base station 19. The base station 19 forwards the packet(s) through the traffic network 21 to the PDSN, which routes the packets through the Ethernet 25 of OSPF region 1 (27) to the transcoding facility at 35.

Part of the message received at step S7 will identify the type of device, that is to say the type of mobile station, of destination station 15. That message will also identify both mobile stations 13 and 15 involved in the direct MS-to-MS type MMS message communication. The node 35 will examine the multimedia content of the MMS message and will utilize its transcoder function if necessary to convert the message to a format that is compatible with the identified device type of the destination mobile station 15. The node 35 sends the MMS message (transcoded if/as necessary) back to the mobile station 15 as a packet transmission in step S8, that is to say through the Ethernet 25, the PDSN 23, the traffic network 21, the base station 19 and over the air to the mobile station 15 in our example. If the communication is successful, the mobile station 15 stores the MMS message received back (e.g. transcoded if necessary) from the node 35 and can display or otherwise output the MMS message content to the user. Although not shown, the mobile station 15 could send an acknowledgement back to the node 35.

Based on the identifications of the mobile stations 13 and 15, the node 35 creates two billing records. One call detail record (CDR) for billing purposes is for message transmission by the originating mobile station 13, and the other CDR is with regard to message delivery to the destination mobile station 15. The node 35 can supply those CDR billing records to a billing system (not shown) for further processing, to bill both subscribers in a manner analogous to billing for existing MMS communications. For example, if the carrier wants to, the CDR records allow the carrier to bill both subscribers as if there had been no change from the existing MMS service (in the same manner and/or at the same rates). Of course, the carrier may opt to offer reduced rates to either one or both subscribers for the direct MS-to-MS communications, for commercial reasons, in view of the cost savings the carrier may achieve by implementing the direct MS-to-MS communication technique.

As shown by the discussion, the signal flow/process of FIG. 3 enables direct communication of a MMS message between mobile stations through a wireless mobile communication network, without interaction with any MMS center of the network. The signaling bypasses any MMSC, and the message delivery bypasses any MMSC. Where the originating and destination mobile stations, 13 and 15 in our example, are operating through the same regional portion of the network (through elements of or connected to OSPF region 1 (27) in our example) there is only a query and response exchange of a minimal signaling message through the WAN 31 with the UAProf database 33. As discussed in more detail later, with regard to FIG. 4, more of the signaling and message communications may traverse the WAN 31, when the destination mobile stations are operating through different regional portions of the network; but the MS-to-MS communication still need not interact with any core MMS center element of the network.

The discussion of the signal flow/process of FIG. 3 above assumed successful communication throughout, so that the MMS message was timely delivered to the destination mobile station. However, situations will arise in which the MMS communication is intended to be between two mobile stations but for some reason is unsuccessful. Techniques are contemplated to adapt the procedures to address such exceptions/failures (see notes at the bottom of FIG. 3). A brief discussion of a few examples may be helpful.

In the current network deployments, an IP address remains validly assigned or bonded to a particular mobile station for a limited period of time, unless that station continues to use the address for packet communication. The station may conduct other non-IP communications, e.g. SMS and/or circuit switched voice communications, but the IP address will be recovered and reassigned if the mobile station does not send or receive any IP packets for the set time period. Hence, if the mobile station 13 otherwise remains idle with respect to packet service for a period longer than the set limit, e.g. for more than 10 minutes following the UAProf query (S1) and response (S2) but before an MMS delivery, then the mobile station 13 may lose the assignment of the IP address that was contained in the SMS message regarding MMS notification that the station sent at step S3.

The MMS devices (particularly the originating mobile station 13) may be designated as 'always on' so as to retain an assigned IP address for up to 24 hours from the time of initial registration or log-in (initial assignment of the particular IP address). The always on provisioning reduces the number of wake ups of the mobile stations. Most device to device MMS messages are delivered within three minutes of their transmission, so that the destination station 15 will often be able to obtain the MMS message from the originating mobile station 13 even if it is not provisioned as an always on type device.

However, some messages may not be delivered before the originating station's IP address assignment expires. In such cases, the destination mobile station 15 may not be able to retrieve the message from the originating station 13 in the manner discussed above relative to steps S5 and S6, because the IP address contained in the SMS notification message (at S3) is no longer assigned to the originating station 13. There are several techniques that may be utilized to deliver the MMS message even after the originating station's IP address assignment expires.

For example, in a scenario where the station 13 loses its assignment if it is packet-service-idle for more than 10 minutes, the destination mobile station 15 would look at the age of the SMS message it received. If some set time has passed, e.g. it has been more than 15 minutes since the SMS message was originally sent, then the destination mobile station 15 sends a SMS message of its own back to the originating station 13. This SMS message includes the unique application identifier for the MS-to-MS type MMS communication application, in the "from" field, to essentially wake up that application in the originating mobile station 13. The SMS message also includes the URI of the message and causes the originating station 13 to wake up the application 93. In this example, the SMS causes the mobile station 13 to initiate a procedure (including obtaining/using an up to date IP address when the application wakes-up) to push the MMS message through the network to the destination mobile station 15. A similar solution may be used if for some reason packet communication with station 13 initially fails, e.g. at S5.

An alternative approach for an always on originating mobile station, where the message is not obtained by the destination device within an appropriate time, e.g. 24 hours, would be for the originating station 13 to forward the MMS message to a core MMSC, in essentially the normal manner, after the time limit expires without direct retrieval by the destination mobile station 15.

The techniques discussed above remove a substantial amount of the signaling and message traffic going to and from the MMSC via the WAN. The transcoding function is moved to or replicated in the local or regional portion network, to eliminate the need for transcoding at the MMSC without the need to transcode in the mobile stations. The interaction with that node also supports other desirable functions, such as LEA support and/or record generation for billing purposes. The handling of the messages for mobile station to mobile station MMS also enhances the ability to handle mass events, e.g. sending of messages by people at a professional football game. The radio network can handle the SMS signaling to initiate the notifications, and the SMSC will regularly tickle the destination stations for some time. Even if the network will not handle the actual MMS traffic at peak, the destinations will eventually receive their notification messages and be able to retrieve the MMS messages. Far less MMS traffic will be lost even in the context of the mass event.

For simplicity, the network and signal flow examples discussed above related to situations in which the originating and destination mobile stations are operating or receiving services through the same regional portion of the network 10. However, those skilled in the art will recognize that the direct mobile station-to-mobile station type MMS message communications may be similarly implemented for situations in which the two mobile stations are in different regions. For discussion of such an example, attention is directed to FIG. 4, which is a simplified functional block diagram of a wireless mobile communication network offering direct mobile station-to-mobile station communication of MMS message, between mobile stations operating in the two different regions.

Figure 4:
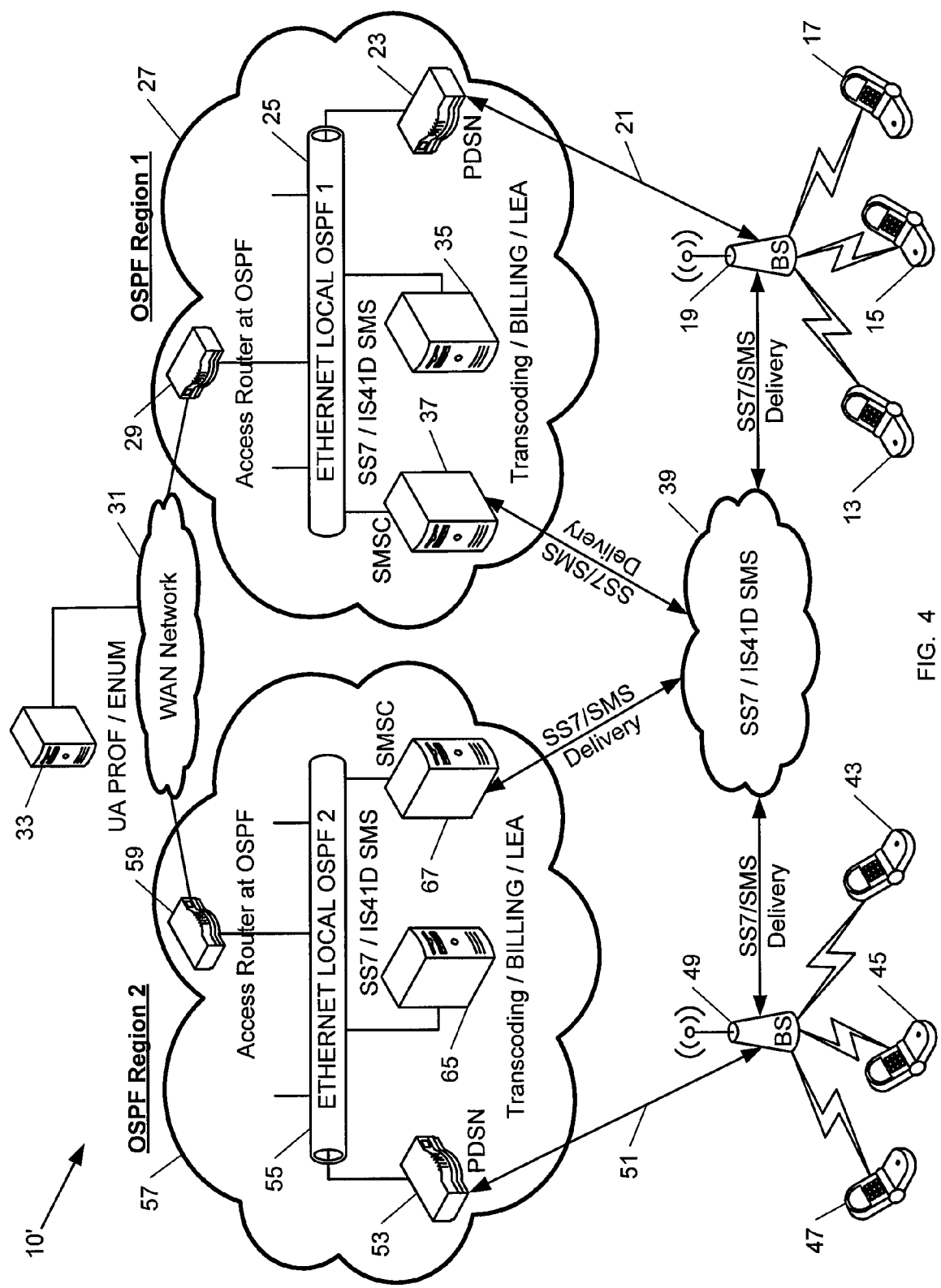
FIG. 4 is a simplified functional block diagram of a wireless mobile communication network offering direct mobile station-to-mobile station communication of MMS message, between mobile stations operating in the two different regions.

FIG. 4 is an expanded view of the network, now designated network 10'. In the expanded view, the network includes the elements shown in FIG. 1 (similarly numbered) as well as elements in another regional portion of the network. The elements in the other region would serve a somewhat different geographic area or region. Of course those skilled in the art will recognize that a large scale deployment would include similar elements in yet further regions.

For purposes of later discussion, mobile stations 43, 45 and 47 appear in the drawing, to represent examples of the mobile stations that may receive various services via the network 10', in this case in the second region. Physical elements of a RAN, in the second region, include a number of base stations represented in the example by the base station (BS) 49. Although not separately shown, such a base station 49 typically comprises a base transceiver system (BTS) which communicates via an antennae system at the site of base station and over the airlink with one or more of the mobile stations 43, 45 and 47, when the mobile stations are within range, as discussed above relative to the base station 19.

The radio access network also includes a traffic network represented generally by the two-way arrow at 51, which carries the user communications for the mobile stations 43, 45 and 47. Individual elements such as switches and/or routers forming the traffic network 51 are omitted here form simplicity. For packet data communications, such as MMS communications, the traffic network 51 supports two-way packet communication of mobile station traffic between the base stations 49 and a Packet Data Serving Node (PDSN) 53, similar to the PDSN 23. The PDSN 53 provides the packet routing function from the radio network formed by base stations 49 and traffic network 51 to/from other packet switched networks, in the example, via a local private Ethernet 55 providing packet transport between network elements in the second region.

In the example, the IP routing elements in the second region coupled for packet communication via the Ethernet 55 are configured as OSPF region 2 (57). The components in OSPF region 2 (57) include an access router 59 connected to the Ethernet 55, which provides packet routing connectivity to the WAN 31. The WAN 31 provides backhaul connectivity from the regional portion of the network 10' to other regions including the first regional portion of the network. As discussed earlier, the WAN also provide backhaul connectivity from the second regional portion of the network 10' to various core network elements, including the UAProf or ENUM type database 33.

Like the OSPF Region 1 (27), the OSPF Region 2 (57), includes a computer platform 65 serving as a node for performing the transcoding function. The node 65 also creates the CDR type billing records for direct mobile station-to-mobile station communication of MMS messages to destination stations served through the OSPF Region 2 (57), much like the node 35 creates the billing records for direct mobile station-to-mobile station communication of MMS messages to destination stations served through the OSPF Region 1 (27). The node 65 may also provide other functions, such as reporting or message intercept for a law enforcement agency (LEA).

In the example, the second regional portion of the network 10' also includes one or more Short Message Service Centers (SMSCs) 67. The SMSC 67 connects to the regional Ethernet network 55 as well as to the SS7 signaling network 39. In this way, mobile stations operating in the second region can send and receive SMS messages, in the same manner as did the mobile stations operating in the first region.

A direct communication of a MMS message between mobile stations, such as any two of the stations 43, 45 and 47 would utilize essentially the same procedure as discussed above with regard to FIG. 3, albeit conducted through the radio network and OSPF Region elements serving the second area. Direct mobile station-to-mobile station communications between mobile stations operating in the different regions will utilize a procedure much like that described above relative to FIG. 3, except that messages between stations will flow between the two regional OSPF regions 27, 57 of the network 10'. Reference to the drawing and earlier discussion should suffice for many readers, however, it may be helpful to summarize an example of such an inter-region message communication here.

By way of an example, consider a MMS communication such as for a picture communication, from an originating mobile station 13 operating through the first region to a destination mobile station 45 operating in the second region. A direct communication of a MMS message between mobile stations, such as 13 and 45 through the wireless mobile communication network 10', still would not involve any interaction with a MMSC (or MMS server or MMS relay) of the network. Here, we will assume that both mobile stations are logged in (or will log-in as/when necessary) for packet data services and therefore will have (or will obtain) an assigned IP address for packet routing through the network 10'.

Upon user operation of the originating mobile station 13 to originate communication of a new MMS message, the mobile station 13 sends a query to the wireless mobile communication network 10', e.g. to the database 33, to determine whether or not the destination is a mobile station of a subscriber of a carrier operating the wireless mobile communication network 10'. If so, then the originating mobile station 13 sends a SMS message notifying the destination mobile station 45 of the availability of the MMS message. Again, SMS routing relies on the regular numbers identifying the destination station, e.g. its MDN, and involves signaling communications via the SS7 signaling network 39, without IP packet routing and without interaction with a MMSC. Hence, the SMS notification message can be sent through one or more of the SMSCs and the SS7 network 39 to the destination mobile station 45.

As in the earlier example, the SMS message contains the IP address for packet communication with the originating mobile station 13. The SMS message also contains an identifier for use in retrieval of the MMS message. The SMS message is sent directly through the wireless mobile communication network 10' from the originating mobile station 13 to the destination mobile station 45, that is to say in a manner that does not involve any interaction with a MMS center of the network.

In response to the SMS message, the destination mobile station 45 sends a packet message using the IP address of the originating mobile station 13 through the wireless mobile communication network 10' to the originating mobile station 13. Again, the communication flows directly through the network 10, that is to say that the message transits the network 10 without interaction with a MMS center of the network. In the inter-region example, the mobile station 45 sends the message over the air to the base station 49, through the traffic network 51 to the PDSN 53. From the PDSN 53, the message is routed through the Ethernet 55 and access router 59 to the WAN 31. The WAN 31 in turn supplies the packet(s) of the message to the OSPF Region 1 (27) for delivery to the originating mobile station 13. More specifically, the WAN 31 supplies the packet(s) of the message through the access router 29 to the Ethernet 25. The packet message is routed through the Ethernet 25 to the PDSN 23 and flows through the traffic network 21 to the base station 19 where the mobile station 13 is currently receiving wireless communication service. The base station 19 in turn transmits the packet(s) of the message over the airlink to the originating mobile station 13.

This packet message requests retrieval of the MMS message and uses the identifier for that request. The message also includes an IP address, for packet communication with the destination mobile station 45. In response to the retrieval request, the originating mobile station 13 uses the IP address of the destination mobile station 45 to send a packet message containing the MMS message back through the network 10' to the destination mobile station 45. The packet message containing the MMS message transits directly through the wireless mobile communication network 10' from the originating mobile station 13 to the destination mobile station 45, that is to say without interaction with a MMS center of the network. More specifically, the originating mobile station 13 transmits packets containing the actual MMS message over the airlink to the base station 19 and through the traffic network 21 to the PDSN 23. From the PDSN 23, the MMS message packets are routed through the Ethernet 25 and access router 29 to the WAN 31. The WAN 31 in turn supplies the packets of the MMS message to the OSPF Region 2 (57) for delivery to the destination mobile station 45. More specifically, the WAN 31 supplies the packet(s) of the message through the access router 59 to the Ethernet 55. The packets of the MMS message are routed through the Ethernet 55 to the PDSN 53 and flow through the traffic network 51 to the base station 49 where the mobile station 45 is currently receiving wireless communication service. The base station 45 in turn transmits the packets of the MMS message over the airlink to the destination mobile station 45.

As shown by the preceding description, where the destination is a mobile station 45 of the carrier operating the network 10', the signaling between the mobile stations 13 and 45 resolves any address issues between the two stations, without requiring any involvement of any MMSC, such as a central MMS server, even where the two stations are operating in different areas or through different regional portions of the network. Similarly, the transfer of the actual MMS message content directly between the mobile stations avoids any communication with or use of resources at the MMSC.

Functions such as transcoding and creation of billing records are implemented in the regional networks. Hence, in the MMS communication example of FIG. 4, after the originating station 13 sends the packet message containing the MMS message to the destination mobile station 45, that station 45 sends the MMS message to the node 65, in the regional portion of the wireless mobile communication network 10' currently serving the destination mobile station 45. The transcoding node 65 determines whether or not transcoding is necessary, for the particular MMS content. For example, based on the device type of the destination mobile station 45, the node 65 will determine if that station is capable of decoding the message content. If so, the node 65 can simply send back the MMS message. If the destination mobile station 45 is not capable of decoding the message content in its original form, the node 65 transcodes the content into a form that the mobile station 15 can decode; and then the node 65 sends back the transcoded message content. In any event, the MMS message is sent back from the node 65 to the destination mobile station 45, for presentation of content of the MMS message to a user of the destination mobile station 45.

Whether transcoded or not, the handling of the MMS message through the node 65 permits creation of at least one CDR type billing record for the communication of the MMS message from the originating mobile station 13 to the destination mobile station 45, in a manner similar to the earlier examples. For example, the node 65 may generate a billing record for the originating mobile station 13 for having sent the MMS message, and the node 65 may generate a billing record for the destination mobile station 45 for having received the MMS message. Again, such records may be sent to a central billing system (not shown) operated by the carrier, for further processing to generate the actual bills to be sent to the respective subscribers.

As shown by the discussion above, a number of aspects of the mobile station-to-mobile station MMS communication rely on programming of the mobile stations. Program aspects of the technology may be thought of as products or articles of manufacture, typically in the form of executable code and/or associated data that is carried on or embodied in a type of machine readable medium, for mobile station execution. Storage media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator or affiliate into one or more of the mobile stations. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to storage media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in mobile stations shown in the drawings or in any computer(s) or the like that may be used to supply such programming to the mobile stations for installation and/or upgrade purposes. Volatile storage media include dynamic memory, such as main memory of such a computer platform or of any of the mobile stations. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer or machine readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM, an EPROM and an EEPROM, a FLASH-EPROM, any other memory chip or cartridge, a carrier wave transporting data or instructions, cables or links transporting such a carrier wave, or any other medium from which a computer or other machine can read programming code and/or data. Many of these forms of computer readable media may be involved in carrying one or more sequences of one or more coded instructions to a processor for execution for example in a mobile station.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Appendix: Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

AAA—Authentication, Authorization and Accounting
BS—Base Station
BTS—Base Transceiver System
CD—Compact Disk
CDR—Call Detail Record
CD-ROM—Compact Disk-Read Only Memory
DVD—Digital Video Disk
DVD-ROM—Digital Video Disk-Read Only Memory
DNS—Domain Name Service
EEPROM—Electrically Erasable Programmable Read Only Memory
ENUM—tElephone NUmber Mapping
EPROM—Erasable Programmable Read Only Memory
EVDO—1x/Evolution-Data Only
GPRS—General Packet Radio Service
GSM—Global System for Mobile
GW—Gateway
HTTP—Hypertext Transfer Protocol
ID—IDentification
IP—Internet Protocol
IR—InfraRed
LEA—Law Enforcement Agency
MDN—Mobile Director Number
MIN—Mobile Identification Number
MO—Mobile Originated
MT—Mobile Terminated
MMS—Multimedia Message Service
MMSC—Multimedia Message Service Center
MS—Mobile Station
MSC—Mobile Switching Center
MTSO—Mobile Telephone Switching Office
OSPF—Open Shortest Path First
PDSN—Packet Data Serving Node
PPP—Point-to-Point Protocol
PROM—Programmable Read Only Memory
RAM—Random Access Memory
RAN—Radio Access Network
RF—Radio Frequency
ROM—Read Only Memory
SMPP—Short Message Peer-to-Peer
SMS—Short Message Service
SMSC—Short Message Service Center
SS7—Signaling System 7
UA—User Agent
UAProf—User Agent Profile
UDP—User Datagram Protocol
UMTS—Universal Mobile Telecommunications Systems
URI—Uniform Resource Identifier
URL—Universal Resource Locator
XCVR—Transceiver

What is claimed is:

1. A method comprising steps of:
responsive to user operation of an originating mobile station to originate communication of a multimedia message service (MMS) message to a destination, sending a query from the originating mobile station to the wireless mobile communication network to determine whether or not the destination is a mobile station of a subscriber of a carrier operating the wireless mobile communication network;
storing the MMS message in storage in the originating mobile station;
upon receiving a network determination that the destination is a mobile station of a subscriber of the carrier operating the wireless mobile communication network, initially sending from the originating mobile station to the destination mobile station a short message service (SMS) message notifying the destination mobile station of availability of the MMS message, the SMS message including an Internet Protocol (IP) address of the originating mobile station for packet communication and an identifier assigned by a MMS application running on the originating mobile station for use in direct retrieval of the MMS message from the storage in the originating mobile station by the destination mobile station, directly through the wireless mobile communication network from the originating mobile station to the destination mobile station, without interaction with a MMS center of the network;
responsive to the SMS message:
activating another MMS application on the destination mobile station; and
upon activating the other MMS application, obtaining another IP address by the destination mobile station for packet communication;
sending from the destination mobile station a packet message using the received IP address of the originating mobile station, requesting retrieval of the MMS message using the identifier, directly through the wireless mobile communication network from the destination mobile station to the originating mobile station, without interaction with a MMS center of the network, the packet message requesting retrieval including the other IP address of the destination mobile station; and
sending from the originating mobile station another packet message containing the MMS message from the storage in the originating mobile station, using the other IP address of the destination mobile station as the destination address of the other packet message, directly through the wireless mobile communication network from the originating mobile station to the destination mobile station, without interaction with a MMS center of the network;
responsive to user operation of the originating mobile station to originate communication of a first further MMS message to a first further destination:
querying the wireless mobile communication network to determine whether or not the first further destination is a mobile station of a subscriber of the carrier operating the wireless mobile communication network;
after determining that the first further destination is a mobile station of a subscriber of the carrier operating the wireless mobile communication network initially sending to the first further destination mobile station, another SMS message notifying the first further destination mobile station of availability of the first further MMS message the other SMS message including the IP address of the originating mobile station for packet communication and another identifier for use in direct retrieval of the first further MMS message from storage in the originating mobile station by the first further destination mobile station, directly through the wireless mobile communication network from the originating mobile station to the first further destination mobile station, without interaction with a MMS center of the network; and upon failure of the first further destination mobile station to request retrieval of the first further MMS message within a predetermined period of time following the sending of the other SMS message, sending the first further MMS message through the wireless mobile communication network from the originating mobile station to a MMS center of the network for delivery of the first further MMS message to the first further destination mobile station; and responsive to user operation of a further originating mobile station to originate communication of a second further MMS message to a second further destination:

query the wireless mobile communication network to determine whether or not the second further destination is a mobile station of a subscriber of the carrier operating the wireless mobile communication network; and upon determining that the second further destination is not a mobile station of a subscriber of the carrier operating the wireless mobile communication network, sending the second further MMS message through the wireless mobile communication network from the further originating mobile station to a MMS center of the network for delivery of the second further MMS message to the second further destination.

2. The method of claim 1, wherein after the step of sending the packet message containing the MMS message to the destination mobile station, the method further comprises steps of:

sending the MMS message from the destination mobile station to a node, in a regional portion of the wireless mobile communication network currently serving the destination mobile station, capable of performing a transcoding function;

sending the MMS message from the node back to the destination mobile station, for presentation of content of the MMS message to a user of the destination mobile station; and at the node in the regional portion of the wireless mobile communication network, creating at least one billing record for the communication of the MMS message from the originating mobile station to the destination mobile station.

3. The method of claim 1, wherein a "from" field of the SMS message notifying the destination mobile station of the availability of the MMS message includes an identifier of a MMS communication application supporting direct mobile station-to-mobile station MMS communication.

4. A method, comprising steps of:

responsive to user operation of an originating mobile station to originate communication of a multimedia message service (MMS) message to a destination, sending a query from the originating mobile station to the wireless mobile communication network to determine whether or not the destination is a mobile station of a subscriber of a carrier operating the wireless mobile communication network;

storing the MMS message in storage in the originating mobile station;

upon receiving a network determination that the destination is a mobile station of a subscriber of the carrier operating the wireless mobile communication network, initially sending from the originating mobile station to the destination mobile station a short message service (SMS) message notifying the destination mobile station of availability of the MMS message, the SMS message including an Internet Protocol (IP) address of the originating mobile station for packet communication and an identifier assigned by a MMS application running on the originating mobile station for use in direct retrieval of the MMS message from the storage in the originating mobile station by the destination mobile station, directly through the wireless mobile communication network from the originating mobile station to the destination mobile station, without interaction with a MMS center of the network;

responsive to the SMS message, sending from the destination mobile station a packet message using the received IP address of the originating mobile station, requesting retrieval of the MMS message using the identifier, directly through the wireless mobile communication network from the destination mobile station to the originating mobile station, without interaction with a MMS center of the network, the packet message requesting retrieval including an IP address of the destination mobile station for packet communication with the destination mobile station;

sending from the originating mobile station a packet message containing the MMS message from the storage in the originating mobile station, using the IP address of the destination mobile station as the destination address of the packet message, directly through the wireless mobile communication network from the originating mobile station to the destination mobile station, without interaction with a MMS center of the network; and further responsive to user operation of the originating mobile station to originate communication of another MMS message to another destination, querying the wireless mobile communication network to determine whether or not the other destination is a mobile station of a subscriber of the carrier operating the wireless mobile communication network;

upon determining that the other destination is a mobile station of a subscriber of the carrier operating the wireless mobile communication network, sending a short message service (SMS) message notifying the other destination mobile station of the availability of the other MMS message and providing another IP address for packet communication with the originating mobile station and providing another identifier for use in retrieval of the other MMS message, directly through the wireless mobile communication network from the originating mobile station to the other destination mobile station, without interaction with a MMS center of the network;

upon determining at the other destination mobile station that the other MMS message has not been retrieved from the originating mobile station within a predetermined period, sending a SMS message from the other destination mobile station requesting retrieval of the MMS message using the other identifier, directly through the wireless mobile communication network from the other destination mobile station to the originating mobile station without interaction with a MMS center of the network, the SMS message requesting retrieval of the other MMS message including the other IP address for packet communication with the other destination mobile station; and sending a packet message containing the other MMS message, using the IP address of the other destination mobile station, directly through the wireless mobile communication network from the originating mobile station to the other destination mobile station without interaction with a MMS center of the network.

5. An article of manufacture comprising:

a machine readable non-transitory storage medium; and executable code for a mobile station embodied in the non-transitory storage medium, wherein execution of the code by a processor causes the mobile station to implement originating mobile station functions relating to direct communication of one or more multimedia message service (MMS) messages through a wireless mobile communication network, without interaction with a MMS center of the network, the originating mobile station functions of the mobile station comprising:

responsive to user operation of the mobile station to originate communication of an outbound MMS message to a destination, sending a query to the wireless mobile communication network to determine whether or not the destination is a mobile station of a subscriber of a carrier operating the wireless mobile communication network;

storing the MMS message in storage of the mobile station;

upon receiving a network determination that the destination is a mobile station of a subscriber of the carrier operating the wireless mobile communication network, initially sending to the destination mobile station a short message service (SMS) message notifying the destination mobile station of availability of the outbound MMS message, the SMS message including an Internet Protocol (IP) address of the mobile station for packet communication and an identifier assigned by a MMS application running on the mobile station for use in direct retrieval of the outbound MMS message from the storage in the mobile station by the destination mobile station, directly through the wireless mobile communication network from the mobile station to the destination mobile station, without interaction with a MMS center of the network;

receiving a packet message addressed to the mobile station requesting retrieval of the MMS message using the identifier, directly through the wireless mobile communication network from the destination mobile station without interaction with a MMS center of the network, the packet message requesting retrieval including another IP address of the destination mobile station, obtained by the destination mobile station upon an activation of another MMS application on the destination mobile station, for packet communication; and sending another packet message containing the outbound MMS message, using the other IP address of the destination mobile station as the destination address of the other packet message, directly through the wireless mobile communication network from the mobile station to the destination mobile station without interaction with a MMS center of the network;

receiving a further SMS message notifying the mobile station of availability of an inbound MMS message and providing a further IP address for packet communication with an originating mobile station and a further identifier for use in retrieval of the inbound MMS message, directly through the wireless mobile communication network from the originating mobile station, without interaction with a MMS center of the network;

responsive to the received further SMS message, sending a first further packet message using the further IP address of the originating mobile station, requesting retrieval of the inbound MMS message using the further identifier, directly through the wireless mobile communication network from the mobile station to the originating mobile station without interaction with MMS center of the network, the message requesting retrieval of the inbound MMS message including the IP address for packet communication with the mobile station; and receiving a second further packet message containing the inbound MMS message, addressed to the mobile station, directly through the wireless mobile communication network from the originating mobile station without interaction with a MMS center of the network; and sending the inbound MMS message from the mobile station to a node, in a regional portion of the wireless mobile communication network currently serving the mobile station, capable of performing a transcoding function;

receiving the inbound MMS message back from the node of the regional portion of the wireless mobile communication network; and then presenting content of the inbound MMS message to a user of the mobile station.

* * * * *